United States Patent
Anzinger et al.

(10) Patent No.: US 7,934,635 B2
(45) Date of Patent: *May 3, 2011

(54) METHOD FOR MANUFACTURING A BODY

(75) Inventors: Claus Anzinger, Neutraubling (DE); Willibald Schürz, Pielenhofen (DE); Martin Simmet, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 428 days.

This patent is subject to a terminal disclaimer.

(21) Appl. No.: 11/747,113

(22) Filed: May 10, 2007

(65) Prior Publication Data

US 2007/0272769 A1    Nov. 29, 2007

(30) Foreign Application Priority Data

May 15, 2006    (DE) .......................... 10 2006 022 601

(51) Int. Cl.
  *B23K 31/02*    (2006.01)
(52) U.S. Cl. ..................... 228/254; 228/245; 228/262.9; 239/533.2
(58) Field of Classification Search .................. 228/245, 228/212, 101, 114, 262.9, 254; 239/600, 239/403, 88–96, 533.2–533.12, 585.1–585.5; 29/428, 890.12, 890.124, 890.142
See application file for complete search history.

(56) References Cited

U.S. PATENT DOCUMENTS

| | | | | |
|---|---|---|---|---|
| 3,129,502 | A * | 4/1964 | Olson | 228/254 |
| 4,444,731 | A * | 4/1984 | Konoki et al. | 422/310 |
| 5,123,678 | A * | 6/1992 | Froger et al. | 285/110 |
| 6,257,882 | B1 * | 7/2001 | Wyllie, II | 433/8 |
| 6,913,210 | B2 * | 7/2005 | Baasch et al. | 239/407 |
| 7,793,867 | B2 * | 9/2010 | Anzinger et al. | 239/533.2 |
| 2005/0279327 | A1 * | 12/2005 | Morita | 123/468 |

FOREIGN PATENT DOCUMENTS

DE    10 2004 033 979 A1    2/2006

OTHER PUBLICATIONS (1) ASM, Binary Alloy Phase Diagrams, vol. ! (OH; ASM International, 1986; (2) ASM, Binary, vol. 2, p. 1739.*

\* cited by examiner

*Primary Examiner* — Roy King
*Assistant Examiner* — Michael Aboagye
(74) *Attorney, Agent, or Firm* — King & Spalding L.L.P.

(57) ABSTRACT

A body has at least one first metallic body part and one second metallic body part. The first body part is coated with a nickel-phosphor layer. The first and second body parts are assembled. The first and second body parts are heated such that a soldered connection is produced between the first and second body part as a result of the nickel-phosphor layer.

4 Claims, 2 Drawing Sheets

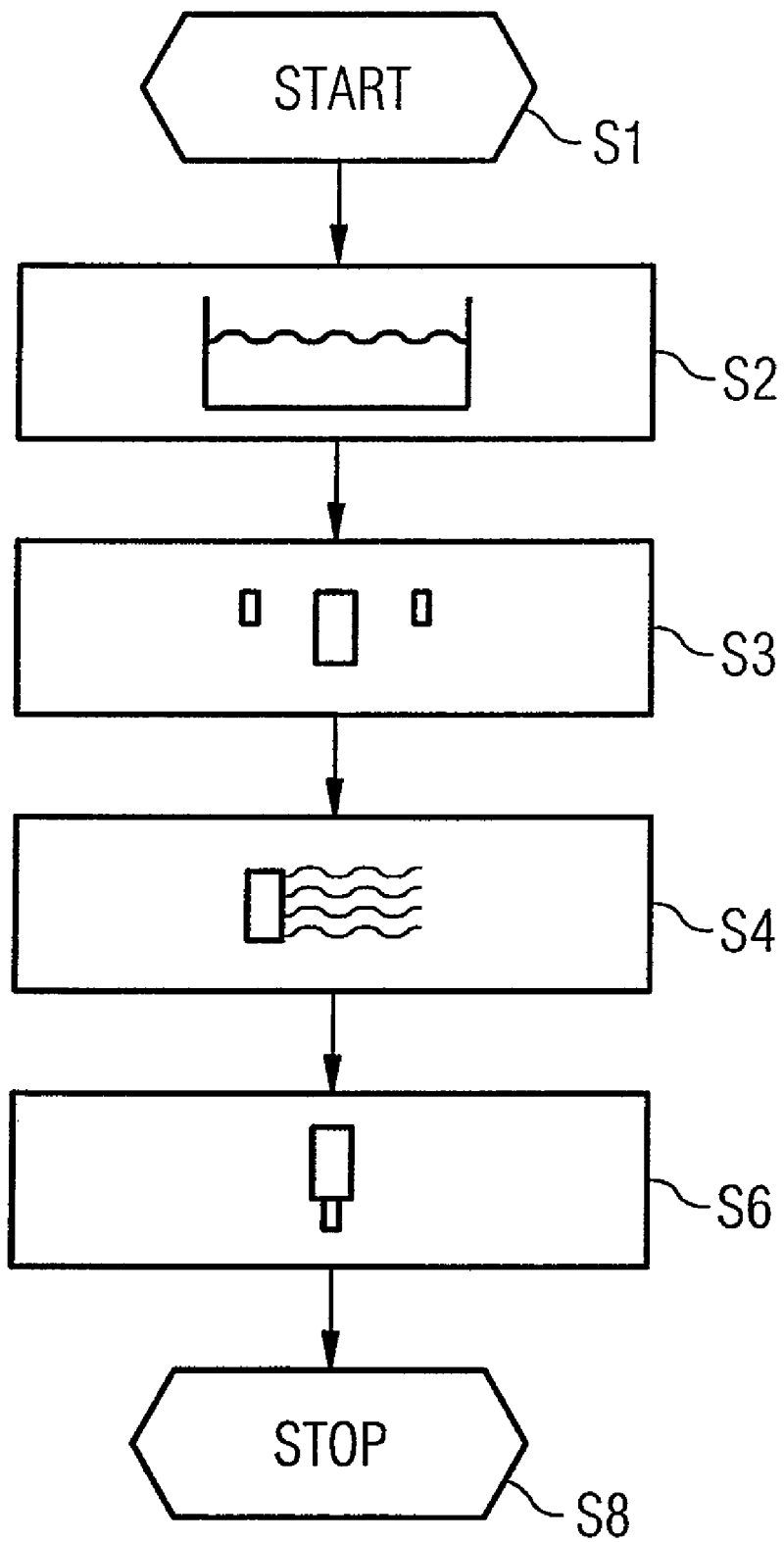

METHOD FOR MANUFACTURING A BODY

RELATED APPLICATION

This application claims priority from German Patent Application No. 10 2006 022 601.1, which was filed on May 15, 2006, and is incorporated herein by reference in its entirety.

TECHNICAL FIELD

The invention relates to a method for manufacturing a body which comprises a first metallic body part and a second metallic body part.

BACKGROUND

The body may be, for example, a nozzle body which is preferably used for injectors of internal combustion engines. In particular when the body, such as in the case of a nozzle body for example, is to exhibit a very high degree of hardness in subareas and on the other hand is to be easily weldable in other subareas, the embodiment of the body from a single material is frequently critical, since in certain circumstances this cannot adequately satisfy all requirements. Thus, steels containing a high proportion of carbon are typically very well suited to hardening, whereas they are less suitable for welding.

SUMMARY

The object of the invention is to create a simple method for manufacturing a body.

According to an embodiment, a method for manufacturing a body comprising at least one first metallic body part and one second metallic body part, the method comprising the steps of coating the first body part with a nickel-phosphor layer, assembling the first and second body parts, heating the first and second body parts such that a soldered connection is produced between the first and second body part as a result of the nickel-phosphor layer.

BRIEF DESCRIPTION OF THE DRAWINGS

Exemplary embodiments of the invention are explained in more detail below with reference to the schematic drawings, in which:

FIG. 3 shows a flowchart of a method for manufacturing a body.

DETAILED DESCRIPTION

Figure 1:
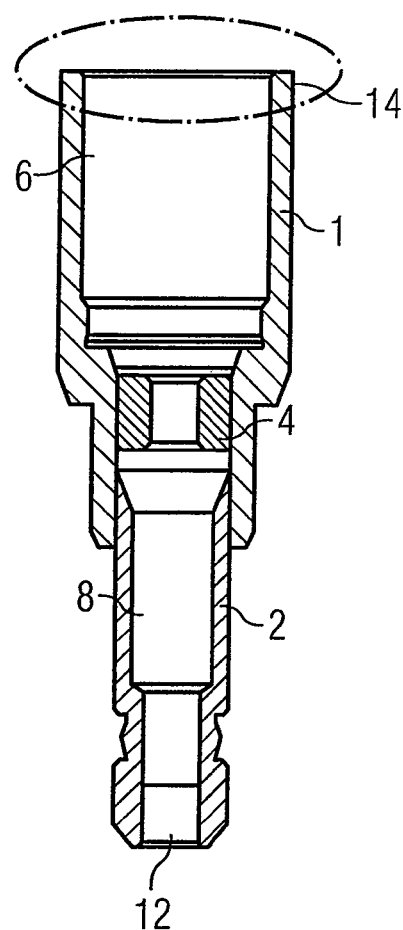
FIG. 1 shows a nozzle body.

According to an embodiment, a method for manufacturing a body comprising at least a first metallic body part and at least a second metallic body part, comprises the following steps: The first body part is coated with a nickel-phosphor layer. A layer of this type can be applied very easily in a manufacturing process and furthermore can also be applied in a suitable thickness. The nickel-phosphor layer is characterized by a good property of adhesion to the metallic first body part and is very well suited, in particular on account of the nickel, as a hard solder for producing a hard-soldered joint. Owing to the phosphor component in the nickel-phosphor layer the layer growth during the coating can be particularly well adjusted. Owing to the phosphor component in the nickel-phosphor layer the melting point and the flow properties of the hard solder can also be very well adjusted. Following the coating of the first body part the first and second body parts are assembled together. Thus, for example, the second body part can be disposed in a recess of the first body part. The first and second body parts are subsequently heated such that a soldered connection between the first and second body part is produced as a result of the nickel-phosphor layer. In this way the first and second body part can then be joined to each other for example tightly, in particular in a high-pressure-proof manner.

The choice of material for the first metallic body part and the second metallic body part can essentially be made independently of each other and optimized in terms of desired material properties of the respective body part.

According to an embodiment of the method, at least one of the first and second body parts comprises a hardenable, temperable metal. The first and second body parts are heated such that a hardening of the first or, as the case may be, second body part takes place when a hardening temperature is reached. This has the advantage that the hard soldering takes place in a same process with the hardening and consequently the hardness of the body part to be hardened is not reduced by the hard soldering operation.

According to a further embodiment of the method, the coating of the first body part with a nickel-phosphor layer is accomplished using a wet-chemical process. In this way the coating process can be particularly easily and precisely controlled and so can be executed very cost-effectively. The first body part is coated with a nickel-phosphor layer using a wet-chemical process preferably in the manner of an autocatalytically deposited layer.

In principle, both the first metallic body part and the second metallic body part can be coated with the nickel-phosphor layer.

Coating using the wet-chemical process can preferably be performed in a coating bath. The first body part is particularly preferably coated together with further first body parts in the coating bath. In this way a plurality of first body parts can be provided with the nickel-phosphor layer simultaneously—and furthermore under the same process conditions—and so can be coated particularly cost-effectively and nonetheless precisely. In this connection the first body parts are preferably introduced into the coating bath as bulk material. In this connection it may then be sufficient, at the end of the coating process, to check only individual first body parts, in particular only a single first body part, with regard to the quality of the nickel-phosphor layer, in particular its layer thickness, which is then representative of those of the other first body parts.

According to a further embodiment the nickel-phosphor layer contains between eight and twelve percent by weight of phosphor. In this regard it has been shown that on the one hand a particularly favorable layer deposition rate can be achieved during the coating and on the other hand the solderability of the nickel-phosphor layer is particular good.

According to a further embodiment the melting temperature of the nickel-phosphor layer is between 850 and 1050 degrees Celsius. A very good soldered joint, in particular hard-soldered joint, can therefore be ensured at the same time, in particular in connection with a currently executing hardening operation of at least one of the first or second metallic body parts.

A body can be embodied for example as a nozzle body. It comprises a first and second metallic body part which can be, for example, a first nozzle body part 1 and a second nozzle body part 2 respectively. However, the body can also be an arbitrary other body which comprises an arbitrary first metallic body part and an arbitrary second metallic body part. The body is explained in more detail below in an exemplary manner with reference to the nozzle body, although the remarks can also be applied regularly to any other bodies.

The nozzle body comprises the first nozzle body part 1 (FIG. 1) and the second nozzle body part 2 and a guide bushing 4. The first nozzle body part 1 has a recess 6 which fully penetrates it in the axial direction. A second nozzle body part 2 is introduced into the first recess 6 of the first nozzle body part 1 and is joined to the latter in a solder zone 10 by means of a hard-soldered joint. The guide bushing 4 is also introduced into the recess 6 of the first nozzle body part and can, for example, likewise be fixed in place in the first nozzle body part 1 by way of a soldered connection.

The second nozzle body part 2 has a recess 8 which fully penetrates it axially and which serves to receive a nozzle needle and which extends to a metering aperture 12 and opens or closes the metering aperture as a function of the position of the nozzle needle, with the result that fluid also present in the recess 8 and where applicable the recess 6 of the first nozzle body part 1 is metered or not as a function thereof.

Figure 2:
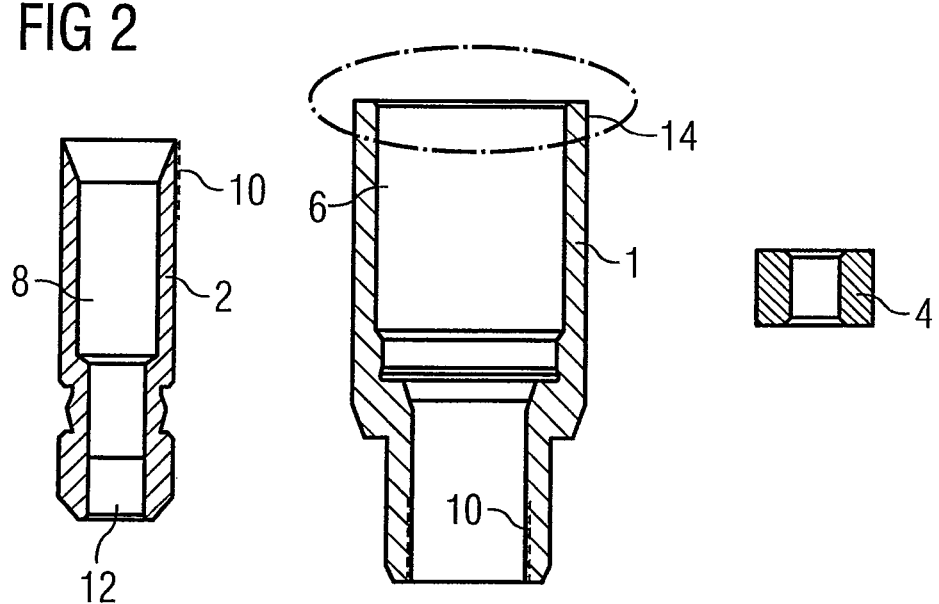
FIG. 2 shows individual parts of the nozzle body according to FIG. 1 prior to their assembly.

A welding zone 14 can be embodied for example in the area of an axial end of the first nozzle body part 1. A hardened zone 16 can be embodied for example in the area of the metering aperture 12 of the second nozzle body part 2. In principle, however, the entire second body part can also be hardened, for example. FIG. 2 shows the first and second nozzle body part 1, 2 and the guide bushing 4 prior to assembly. The second nozzle body part can essentially consist, for example, of a highly carbonaceous and therefore readily hardenable chromium steel. On the other hand, the first nozzle body part is preferably manufactured from an easily weldable metal. The nozzle needle is preferably guided in the guide bushing 4.

The nozzle body is preferably part of an injector. In addition to the nozzle body the injector also comprises an injector housing to which the nozzle body is preferably welded with its first nozzle body part in the welding zone 14. The nozzle body also comprises an actuator by means of which the nozzle needle is driven directly or indirectly. The actuator can be, for example, a piezo actuator or else an arbitrary other actuator known for these purposes. In addition the injector can also comprise, for example, a nozzle clamping nut or an intermediate plate or else hydraulic compensating elements, a lift converter or a hydraulic coupling between the actuator and the nozzle needle.

Where appropriate, fluid, in particular fuel, can be supplied to the injector under very high pressure, for example 1600 bar.

A method for manufacturing the body is explained below with reference to the flowchart of FIG. 3. In reality reference is made in this case to the nozzle body as an example. The program is started in a step S1.

In a step S2 the first body part, i.e. for example the first nozzle body part 1, is coated with a nickel-phosphor layer. To that end, the first body part is preferably coated using a wet-chemical process, and furthermore preferably in a coating bath. Accordingly the part is supplied to a coating bath in which nickel-phosphor is dissolved, said nickel-phosphor then being deposited on the first body part during the period of time the first body part is immersed in the coating bath. The coating of the first body part with the nickel-phosphor layer using a wet-chemical process is preferably performed in the manner of an autocatalytically deposited layer.

Tests have shown that the phosphor component is a critical contributory factor in the layer deposition rate. It has proven particularly advantageous to embody the nickel-phosphor layer in such a way that the phosphor component amounts to between eight and twelve percent by weight, in particular preferably ten percent by weight.

It can be also particularly advantageous if the composition of the nickel-phosphor layer is such that its melting temperature is between 850 and 1050 degrees Celsius, i.e. for example 1000 degrees Celsius.

The manufacturing method can be designed in a particularly cost-effective manner if a plurality of first body parts are coated simultaneously in the coating bath. Preferably said first body parts are supplied as bulk material to the coating bath. The coating bath can also be embodied for example as a drum and execute a predefined rotating or swiveling movement during the coating process and thus ensure a particularly homogeneous coating of the first body parts.

In this way the proportion of process time for the respective body part is very greatly reduced and consequently also the manufacturing costs. Furthermore, the quality of the layer, i.e. in particular the thickness of the nickel-phosphor layer, can be checked using, for example, only one test sample of the first body part, which is particularly easy with regard to the other first body parts and is nonetheless representative of the other first body parts on account of the simultaneously executing coating process.

Following step S2 the first body part is then assembled with the second body part, the second nozzle body part 2 in particular being introduced into the recess 6 of the first nozzle body part 1. In addition the guide bushing 4 is preferably also introduced into the recess 6 of the first body part. The guide bushing 4 can also represent a first or second body part.

Next, the thus preassembled nozzle body is then heated in a step S4 and moreover using a predefinable temperature profile. If the production of a soldered joint in the solder zone 10 is all that is to be achieved during step S4, the nozzle body is heated at least in the solder zone 10 to at least the melting temperature of the nickel-phosphor layer, with the result that after the melting temperature is exceeded a soldered joint, in particular a hard-soldered joint, is produced in the solder zone 10. Coating the first body part with the solderable nickel-phosphor has the advantage that in process engineering terms the layer thickness can be adjusted easily, but nonetheless very precisely, which can ensure a very good soldered connection. The layer thickness of the nickel-phosphor layer before the soldering is carried out can lie in a range, for example, of 8 to 20 μm.

In the preferred case of the hardening process that is also to be carried out in step S4, the nozzle body is heated at least to a hardening temperature of the material of the area to be hardened. The hardening temperature can lie for example at somewhat more than 1000 degrees Celsius. In order to accomplish the hardening, a predefined temperature or heat profile is impressed on the nozzle body. The advantage is that in the course of the hardening process, owing to the properties of the nickel-phosphor layer, its melting temperature is also exceeded and consequently the soldering operation takes place.

Step S4 is preferably carried out in a vacuum oven. If the hardening is performed in step S4, a rapid reduction in temperature is preferably effected after the hardening temperature has been reached.

In a step S5 the nozzle body can then be processed further if necessary or mounted into the injector. The method is then terminated in a step S8.

What is claimed is:

1. A method for manufacturing a nozzle body comprising a metallic nozzle body and a metallic needle guide section, said method comprising the following steps:

coating the nozzle body having a recess with a nickel-phosphor layer using a wet-chemical process, inserting the needle guide section partially in said recess of said nozzle body which has been coated by said wet-chemical process, heating the nozzle body and the needle guide section such that a soldered connection is produced between the nozzle body and the needle guide section as a result of the nickel-phosphor layer, wherein the nozzle body and the needle guide section comprise a hardenable, temperable metal and the nozzle body and the needle guide section are heated such that a hardening of the nozzle body and the needle guide section takes place when a hardening temperature is reached.

2. The method according to claim 1, wherein the needle guide section is not coated by a wet-chemical process.

3. The method according to claim 1, wherein the nickel-phosphor layer contains between eight and twelve percent by weight of phosphor.

4. The method according to claim 1, wherein the melting temperature of the nickel-phosphor layer is between 850 and 1050 degrees Celsius.

* * * * *